United States Patent [19]

Bierman et al.

[11] 4,101,637

[45] Jul. 18, 1978

[54] DIRECT GRANULATION PROCESS FOR TRIPLE SUPERPHOSPHATE

[75] Inventors: Laurence William Bierman; Gary Lynn Long, both of Pocatello, Id.

[73] Assignee: J. R. Simplot Company, Boise, Id.

[21] Appl. No.: 626,772

[22] Filed: Oct. 29, 1975

[51] Int. Cl.² ...................... C01B 15/16; C01B 25/26
[52] U.S. Cl. .................................. 423/309; 423/311; 71/41
[58] Field of Search ............................... 423/308–313; 71/43, 41

[56] References Cited

U.S. PATENT DOCUMENTS

| | | | |
|---|---|---|---|
| 3,006,754 | 10/1961 | Sullivan | 71/41 |
| 3,264,058 | 8/1966 | Geigrsberger et al. | 423/311 |
| 3,467,495 | 9/1969 | Nielsson | 423/309 |

*Primary Examiner*—O. R. Vertiz
*Assistant Examiner*—Gregory A. Heller
*Attorney, Agent, or Firm*—Plumley & Tyner

[57] ABSTRACT

Process for producing triple superphosphate by reacting dilute phosphoric acid and lime, limestone or dolomite and granulating the resultant product.

4 Claims, No Drawings

DIRECT GRANULATION PROCESS FOR TRIPLE SUPERPHOSPHATE

This invention relates to the manufacture of triple superphosphate and more particularly to a direct granulation process using phosphate ores that are relatively unreactive.

Triple superphosphate (TSP) or monocalcium phosphate is a well known fertilizer which is normally made by acidic decomposition of phosphate rock with phosphoric acid. Originally TSP was made by reacting phosphate rock or ore and a concentrated phosphoric acid. The resultant product was allowed to pile-cure over several weeks until most of the phosphate values from the ore were reacted with the acid and thus made available for plants in the form of monocalcium phosphate, after which the resultant TSP was granulated. More recently, the use of dilute phosphoric acid allowed a direct granulation of the product and elimination of the curing pile when using certain reactive ores, e.g. Florida phosphates. However, some phosphate ores, either due to their crystalline structure of the various impurities, which they contain, cannot be sufficiently reacted with dilute acid to produce a satisfactory, cured grade of TSP with the necessary available phosphate values.

The principle of the reaction of phosphoric acid with lime or limestone is not novel. However, in the past, special processing has been necessary. For example, Hechenbleikner, U.S. Pat. No. 1,790,502, required slurry digestion and flash drying for immediate vapor release and produced a powdered material; Nickerson, U.S. Pat. No. 3,291,594 requires high temperature cure drying; Sullivan U.S. Pat. No. 3,006,754 requires concentrated acids and made a solid material instead of a slurry and Stokes, U.S. Pat. No. 1,924,137 requires high purity acid, very dilute solutions and special treatment of the lime.

It is the object of this invention to provide a new method of producing high analysis triple superphosphates by combining dilute phosphoric acid, which can be made from low reactivity ore, with lime, limestones or dolomites.

It is a further objective of this invention to obtain a low pollution emission process.

It is also an objective to provide a process that can use a directly granulated slurry to eliminate pile-curing and/or special rapid or high temperature drying.

We have discovered a method in which, by controlling the sequence of addition, slurry density, temperatures and free water content, dilute acid may be combined with lime, limestone or dolomite to produce a slurry capable of direct granulation into a product available for plant nutrition.

Basically our process combines dilute, 22–38% $P_2O_5$ phosphoric acid, which may be made from low reactivity ore e.g., Western as made by a process such as described in U.S. Pat. No. 3,615,195, with ground lime or limestones which may be calcite, travertine, aragonite or dolomitic in origin. Various impurities such as phosphoric acid plant "muds" or inerts; e.g., gypsum sludge, may be added if desired for disposal and/or grade control. The acid and ore such as lime or limestone are caused to react in an agitated vessel system in which dilute phosphoric acid and the limestone ore, i.e. comminuted limestone, are vigorously agitated and well dispersed in a quantity of previously reacted slurry of TSP. To insure a complete reaction, the volume of feed to the operating volume of the vessel should be at least 1:7. It is essential, according to our invention always to add the limestone ore to the acidic solution to prevent formation of insoluble phosphates. This is a critical feature of the invention. If the acid is added to the limestone ore or if the acid is not adequately dispersed there is encapsulation of unreacted limestone and/or local concentration areas in which dicalcium phosphate instead of monocalcium phosphate is formed. Temperature is maintained between 100°–180° F. Below 100° F, there is a possibility of solution solidification due to crystallization and above 180° F, there may be loss of phosphate water solubility. Essentially a stoichiometric ratio of limestone, lime or dolomite to the acid, to form monocalcium phosphate, is used. Fines from the granulation circuit can be added to increase the slurry crystallization temperature, if needed to improve granulation. Reacted slurry can be recycled in a manner that permits dispersion of reactants. The final slurry is then pumped to a granulator to form pellets which are then dried and screened in a standard granulation circuit. We have found that to prevent formation of dicalcium phosphate the drying temperature must not exceed 220° F. We have found that by adding the limestone, dolomite or lime to weak, phosphoric acid there is no detectable release of fluoride fumes common to present processes using phosphate ore. In addition, probably due, we believe, to the completeness of the reaction in the liquid phase, a stable granulator product is produced that does not continue to emit fluoride vapors requiring extensive pollution control.

The following examples are given to illustrate the invention:

EXAMPLE 1

To demonstrate the unreactive character of certain phosphate ores, in this case Western US phosphate, the following example was conducted.

62.5 gms of comminuted or ground Western US phosphate ore (37.7% $P_2O_5$) was slowly added to and mixed, with rapid stirring, for 20 minutes with 172.5 gms of 30.8% $P_2O_5$ wet process acid made from the same ore source by a process as described in U.S. Pat. No. 3,615,195. The resulting slurry was then dried and analyzed as follows:

| | |
|---|---|
| Total $P_2O_5$ | 46.0% |
| Water Soluble $P_2O_5$ | 35.7% |
| Citrate Insoluble $P_2O_5$ | 8.2% |
| APA (Available Phosphoric Acid as $P_2O_5$) | 37.8% |

EXAMPLE 2

This example illustrates the production of a 0-45-0 product, i.e. containing 45 parts phosphate and no nitrogen nor potassium.

Acid Used — Wet Process Phosphoric Acid as in Example 1
 % $P_2O_5$ — 27.1% Containing 15% (by volume) of inerts for grade control to 45%.
Limestone Used
 90.4% $CaCO_3$
 1.01% MgO
 4.0% $SiO_2$ 91.1 gm of comminuted or ground limestone was slowly added with agitation over a period of 10 minutes to 430.9 gms acid, as foaming permitted, with $P_2O_5$/CaO ratio of 2.53 or $CaCO_3/P_2O_5=0.705$.

A slurry was produced with the following typical characteristics:

Viscosity—7,300–7,500 cps at 43° C
Density—1.49 gm/ml
Free Water—43.9% (Karl Fischer)

When oven dried at 71° C the following product (dried cake) was obtained:

| | |
|---|---|
| Total $P_2O_5$ | 45.53% |
| Citrate Insoluble $P_2O_5$ | 0.05% |
| Free $H_2O$ | 2.75% (Karl Fischer) |
| Water Soluble $P_2O_5$ | 38.76% |
| APA | 45.48% |

EXAMPLE 3

Production of a 0-50-0 Product

Acid Used—Wet Process Phosphoric Acid as in Example 1
$P_2O_5$—33.98% lacking the added inerts thus allowing a high analysis product to be formed Limestone Used
90.4% $CaCO_3$
1.01% Mgo 52.5 gm comminuted or ground limestone was added with agitation over a period of 10 minutes to 200 gm of phosphoric acid, as foaming allowed.

The resultant slurry was then allowed to dry at 83° C to a solid product with the following analysis:

| | |
|---|---|
| Total $P_2O_5$ | 50.46% |
| Citrate Insoluble $P_2O_5$ | 0.12% |
| Water Soluble $P_2O_5$ | 43.10% |
| Free $H_2O$ | 1.24% (Karl Fischer) |
| APA | 50.34% |

EXAMPLE 4

TSP Produced From Dolomite

Feed Acid—Wet Process Phosphoric Acid as in Example 1
$P_2O_5$—31.0% Containing 20% (by volume) inerts for grade control to 45% product.

17.39 gm comminuted $CaCO_3$ and 16.32 gm comminuted $MgCO_3$ was slowly added over a period of 10 minutes with agitation to 159.1 gm of acid.

The resulting slurry was dried at 77° C until dry, producing a product with the following characteristics.

| | | |
|---|---|---|
| Total $P_2O_5$ | 45.71% | |
| Citrate Insoluble $P_2O_5$ | Trace | |
| Free $H_2O$ | 3.84% | (Karl Fischer) |
| Water Soluble $P_2O_5$ | 37.5% | |
| Calculated to contain | 7.2% | MgO |
| APA | 45.71% | |

EXAMPLE 5

Production of TSP Using Lime 22.34 gm of comminuted CaO (95.8%) was added with cooling, to 200 gm of 27.1% wet process phosphoric acid obtained as in Example 1 and containing 15% (by volume) of inerts for grade control.

After stirring for 30 minutes to speed reaction of all of the CaO, the slurry was dried at 160° F overnight.

The analysis of the resulting product is:

| | |
|---|---|
| Total $P_2O_5$ | 44.16% |
| Citrate Insoluble $P_2O_5$ | 0.05% |
| Free $H_2O$ | 2.30% |
| Water Soluble $P_2O_5$ | 38.70% |
| APA | 44.11% |

We claim:
1. In a process for the production of monocalcium phosphate by reaction of phosphoric acid and a material selected from the group consisting of lime, limestone and dolomite, the improvement which comprises: (1) adding said material to a dilute dispersed solution of phosphoric acid containing 22–38% $P_2O_5$ by weight with vigorous agitation while maintaining a temperature of 100°–180° F for a minimum of 3–5 minutes to produce a directly granulatable slurry; (2) granulating the resulting slurry; (3) drying the resultant granulated slurry at a temperature not exceeding 200° F; and (4) recovering the resultant dried and granulated monocalcium phosphate.

2. The process of claim 1 wherein substantially stoichiometric ratios of said lime, limestone or dolomite material to said acid are employed.

3. A continuous process as in claim 1 in which the acid and limestone are dispersed in the ratio of at least 7:1 vol/vol in a slurry of previously reacted monocalcium phosphate.

4. A continuous process as in claim 1 in which the mixing vessel for the reactants comprises a blender or paddle mixer.

* * * * *